(12) United States Patent
Pan et al.

(10) Patent No.: US 8,841,376 B2
(45) Date of Patent: Sep. 23, 2014

(54) METHODS FOR IDENTIFYING AND UTILIZING RUBBER COMPOSITIONS WITH GOOD WET TRACTION PERFORMANCE

(75) Inventors: Xiao-Dong Pan, Akron, OH (US); Pat Sadhukhan, Akron, OH (US); Hiroshi Mouri, Kodaira (JP); Michael W. Hayes, Canton, OH (US); Dennis R. Brumbaugh, North Canton, OH (US)

(73) Assignee: Bridgestone Corporation, Tokyo (JP)

( * ) Notice: Subject to any disclaimer, the term of this patent is extended or adjusted under 35 U.S.C. 154(b) by 1184 days.

(21) Appl. No.: 11/967,829

(22) Filed: Dec. 31, 2007

(65) Prior Publication Data
US 2008/0161467 A1 Jul. 3, 2008

Related U.S. Application Data

(60) Provisional application No. 60/882,934, filed on Dec. 31, 2006.

(51) Int. Cl.
| | |
|---|---|
| *C08C 19/00* | (2006.01) |
| *C08K 3/22* | (2006.01) |
| *C08K 3/00* | (2006.01) |
| *B82Y 30/00* | (2011.01) |

(52) U.S. Cl.
CPC .............. *B82Y 30/00* (2013.01); *C08K 3/0033* (2013.01); *C08K 3/22* (2013.01); *C08K 2201/011* (2013.01)
USPC ........................... 524/492; 524/413; 524/572

(58) Field of Classification Search
USPC ................. 51/307; 152/450, 525, 905; 260/3; 264/216; 497/571; 523/216; 425/28.1; 524/47, 52, 81, 423, 424, 425, 430, 524/431, 437, 442, 445, 447, 448, 449, 450, 524/451, 492, 493, 494, 495, 496, 497, 571, 524/575.5, 579, 580, 413, 572; 527/577
See application file for complete search history.

(56) References Cited

U.S. PATENT DOCUMENTS

| | | | | | |
|---|---|---|---|---|---|
| 2,225,079 | A | * | 12/1940 | Neal | 188/153 R |
| 2,885,381 | A | * | 5/1959 | Svetlik | 524/493 |
| 3,168,487 | A | * | 2/1965 | Spokes et al. | 523/158 |
| 4,255,296 | A | | 3/1981 | Ogawa et al. | |
| 4,468,496 | A | | 8/1984 | Takeuchi et al. | |
| 5,066,702 | A | | 11/1991 | Hayashi et al. | |
| 6,242,522 | B1 | | 6/2001 | Ezawa et al. | |
| 6,476,110 | B1 | | 11/2002 | Papp et al. | |
| 6,489,389 | B1 | | 12/2002 | Ohta et al. | |
| 6,632,871 | B1 | | 10/2003 | Tanaka et al. | |
| 6,734,245 | B2 | | 5/2004 | Baranek | |
| 6,852,785 | B1 | | 2/2005 | Gatti | |
| 6,972,307 | B2 | | 12/2005 | Zimmer et al. | |
| 2003/0004249 | A1 | * | 1/2003 | Yagi et al. | 524/442 |
| 2004/0102557 | A1 | | 5/2004 | Nanni et al. | |
| 2004/0242750 | A1 | | 12/2004 | Hirayama | |
| 2004/0249045 | A1 | * | 12/2004 | Goodman et al. | 524/447 |

FOREIGN PATENT DOCUMENTS

GB 723751 2/1955

OTHER PUBLICATIONS

Santos, Flávio de Paula; Elson de Campos; Marcelo Costa; Francisco Cristóvão Lourenço Melo; Roberto Yzumi Honda; Rogério Pinto Mota. (Apr./Jun. 2003) Superficial Modifications in TiO2 and Al2O3 ceramics. Materials Research 6(3). Available online: http://www.scielo.br/scielo.php?pid=S1516-14392003000300009&script=sci_arttext.*
Sengco, Mario R., Aishao Li, Kimberley Tugend, David Kulis, Donald M. Anderson. (Jan. 26, 2001) Removal of red- and brown-tide cells using clay flocculation. I. Laboratory culture experiments with *Gymnodinium breve* and *Aureococcus anophageferens*. Marine Ecology Progress Series. 210, p. 41-53. Online: http://www.int-res.com/articles/meps/210/m21.*
http://www.thomasnet.com/products/rubber-goods-automotive-69790202-1.html.*
"Tires and Tire Sundries" The Horseless age: the automobile trade magazine, vol. 24, Dec. 29, 1909, p. 769-771 Available online at: http://books.google.com/books.*
R.A. Kruger et al., "The Use of Fly Ash Fillers in Rubber," *1999 International Ash Utilization Symposium*, Oct. 18, 1999, No. 72, (Center for Applied Energy Research, University of Kentucky; Lexington, KY).
B.N.J. Persson et al., "Rubber friction on wet and dry road surfaces: the sealing effect," *Phys. Rev. B*, Jan. 31, 2005, vol. 71, No. 035428, pp. 1-8, (American Physical Society; College Park, MD).
E.M. Bevilacqua et al., "Friction of Rubber on Wet Surfaces," *Science*, May 31, 1968, vol. 160, pp. 959-964, (American Association for the Advancement of Science; Washington, DC).
"Standard Test Method for Measuring Surface Frictional Properties Using the British Pendulum Tester," ASTM E 303-93, Feb. 1, 1994, vol. 4, No. 3, (American Society for Testing and Materials; W. Conshohocken, PA).

(Continued)

*Primary Examiner* — Bijan Ahvazi
*Assistant Examiner* — Chun-Cheng Wang
(74) *Attorney, Agent, or Firm* — Meredith E. Hooker; David G. Burleson (57) ABSTRACT

A rubber formulation with good wet traction properties includes one or more elastomers and at least two types of particulate filler materials including at least one of which has a relatively high free surface energy in water (i.e., a supplemental filler). The formulation containing the supplemental filler(s) can provide a vulcanizate that has a British pendulum (skid) number that is at least ~5% greater than that of a vulcanizate made from an essentially identical formulation that does not contain the supplemental filler(s). Also provided is a method for providing such a formulation which involves identifying one or more supplemental fillers having relatively high free surface energies in water, replacing at least 15% (by wt.) of one or more of the conventional particulate fillers in the formulation with an approximately equivalent volume of supplemental filler particles, and providing the modified formulation.

10 Claims, 1 Drawing Sheet

(56) References Cited

OTHER PUBLICATIONS

R.A. Berner, "Diagenetic Chemical Processes II: Precipitation, Dissolution, and Authegenic Processes," *Early Diagenesis—A Theoretical Approach*, 1980, pp. 90-95 and 104-107, (Princeton University Press; Princeton, NJ).

E. Kokkoli et al., "Effect of Solvents on Interactions between Hydrophobic Self-Assembled Monolayers," *J. of Colloid and Interface Sci.*, 1999, vol. 209, pp. 60-65, (Academic Press; New York, NY).

T. Fujimaki et al., "Recent patents on silica reinforced polymers", *Intl. Poly. Sci. Tech.*, 1999, vol. 26, No. 2, pp. T/26-34, (Smithers Rapra Technology Ltd.; UK).

G. Papastavrou et al., "Interactions between hydrophilic and hydrophobic surfaces on microscopic scale and the influence of air bubbles . . . ," *Europhysics Letters*, Dec. 1, 2000, vol. 52, No. 5, pp. 551-556, EDP Sciences; FR).

A.C. Lasaga, "Ch. 6, Nucleation Theory," *Kinetic Theory in the Earth Sciences*, 1998, pp. 497-536, (Princeton University Press; Princeton, NJ).

H. Mouri et al., "Improved Tire Wet Traction Through the Use of Mineral Fillers," ACS Rubber Division Mtg. (reprint), Jul. 2, 1999, No. 19, pp. 960-968, (American Chemical Society; Washington, DC).

M. Ruths et al., "Boundary Friction of Aromatic Silane Self-Assembled Monolayers Measured with the Surface Forces Apparatus and . . . ," *J. Phys. Chem. B*, 2003, vol. 107, No. 40, pp. 11149-11157, (American Chemical Society; Washington, DC).

* cited by examiner

METHODS FOR IDENTIFYING AND UTILIZING RUBBER COMPOSITIONS WITH GOOD WET TRACTION PERFORMANCE

CROSS-REFERENCE TO RELATED APPLICATION

The present application claims priority to and the benefit of U.S. provisional patent appl. No. 60/882,934, filed 31 Dec. 2006, the entire disclosure of which is incorporated herein by reference.

BACKGROUND INFORMATION

Manufacturers of rubber products long have dispersed fillers into various polymers as a means of providing both physical reinforcement and bulk; see, e.g., *The Vanderbilt Rubber Handbook*, 13th ed. (1990), pp. 603-04. These compositions often contain ~30% by wt. reinforcing filler, which have a great effect on properties as tensile strength, abrasion resistance, and tear and cut resistance of the rubber compound.

Good traction and resistance to abrasion are primary considerations for tire treads; however, motor vehicle fuel efficiency concerns argue for a minimization in their rolling resistance, which correlates with a reduction in hysteresis and heat buildup during operation of the tire. Reducing the buildup of heat in a tire during operation is a primary target for increasing fuel economy of automobiles because a significant portion (on the order of 20%) of the energy derived from combusting gasoline is needed merely to overcome this rolling resistance. Reducing the inherent rolling resistance of the tire means that less fuel is consumed and, concomitantly, less $CO_2$ is emitted.

The foregoing considerations are, to a great extent, competing and somewhat contradictory: treads made from compositions designed to provide good road traction usually exhibit increased rolling resistance and vice versa. Filler(s), polymer(s), and additives typically are chosen so as to provide an acceptable compromise or balance of these properties.

The first material commonly used as a filler was carbon black, which is known to impart good reinforcing properties and excellent wear resistance to rubber compositions. However, carbon black-containing formulations often suffer from increased rolling resistance. To alleviate this, some efforts have focused on reducing the amount (i.e., volume) and/or increasing the particle size utilized, both of which typically entail some deterioration in reinforcing properties and wear resistance.

Over the last quarter of the 20th century, amorphous silica and various treated variants thereof grew in use as a filler, both alone and in combination with carbon black. Use of silica fillers in tread stock can result in tires with reduced rolling resistance, increased road traction on wet surfaces and other enhanced properties. Silica-containing rubber compounds have gained wide acceptance in the manufacture of tire treads, particularly for passenger vehicles.

Nevertheless, consumers, regulatory bodies and vehicle manufacturers continue to demand ever-better vehicle tire performance; accordingly, alternative fillers continue to be investigated.

Aluminum hydroxide, although not as good as carbon black with respect to reinforcement, can impart favorable rolling resistance and wet traction properties. Examples of rubber compounds employing $Al(OH)_3$ as a filler can be found in, e.g., U.S. Pat. Nos. 6,242,522 and 6,489,389. See also H. Mouri et al., "Improved Tire Wet Traction Through the Use of Mineral Fillers," Rubber Chem. and Tech., vol. 72, pp. 960-68 (1999).

Examples of other alternative particulate fillers include metal oxides having very high densities (see U.S. Pat. No. 6,734,235); magnetizable particles such as iron oxide or strontium ferrite used in the manufacture of tire sidewalls (see U.S. Pat. No. 6,476,110); macroscopic (e.g., 10-5000 μm mean diameter) particles of hard minerals such as alumina, $CaCO_3$, and quartz (see U.S. Pat. No. 5,066,702); pumice containing no less than 30% by wt. $SiO_2$ and having a JIS-A hardness of 55-75 (U.S. Publ. No. 2004/0242750 A1); ZnO particles having a diameter of less than 0.01 μm (see U.S. Pat. No. 6,972,307); and $ZnSO_4$, $BaSO_4$ and/or $TiO_2$ with average particle sizes of ~0.5-1.0 μm, ~1.0-2.0 μm and ~0.05-1.0 μm, respectively (see U.S. Pat. No. 6,852,785). More often, potentially useful fillers are merely strung together in list format; see, e.g., U.S. Pat. Nos. 4,255,296 and 4,468,496 which mention silicic acid, $CaCO_3$, $MgCO_3$, talc, FeS, $Fe_2O_3$, bentonite, ZnO, diatomaceous earth, white clay, clay, alumina, $TiO_2$, and carbon black.

In addition to using alternative fillers, some have sought to enhance dispersion of reinforcing filler(s) throughout the elastomeric material(s), which both enhances processability and acts to improve certain physical properties. Dispersion of fillers can be improved by increasing their interaction with the elastomer(s). Examples of efforts of this type include high temperature mixing in the presence of selectively reactive promoters, surface oxidation of compounding materials, surface grafting, and chemically modifying the polymer(s).

Physical properties that are sought to be impacted through improved filler dispersion include reduced hysteresis (as evidenced through lower tan δ values at elevated temperatures, e.g., 50° or 60° C.) and improved wet traction (as evidenced through higher tan δ values at 0° C.). The latter has the potential to negatively impact the rolling resistance of a tire at low temperatures, however.

The surfaces on which most tires are used tend to be made from Portland cement concrete or asphaltic concrete (asphalt). Concrete is a construction material that consists of the reaction product of Portland cement (a mixture of oxides of calcium, silicon and aluminum made by heating limestone with clay and grinding the product with a source of sulfate such as gypsum), construction aggregate (generally gravel, sand, crushed stone, etc.) and water; in recent years, fly ash, blast furnace slag, silica fume, and the like have been used in addition to or in place of some of the cement. Solidification occurs through hydration of the cement (and/or replacement material) which bonds the other components as it hardens.

Asphalt, like Portland cement concrete, is a composite material which consists of a binder and mineral aggregate; however, instead of hydrated cement, a bituminous material acts as the binder. The components are mixed together and then layered and compacted.

Both concrete and asphalt thus contain large amounts of minerals. These must be taken into account when attempting to understand the sliding friction between a tire and a road surface. Specifically, these materials constitute an extremely large fraction of the surface with which the rubber and/or the dispersed particulate filler must interact.

Neither friction (e.g., traction) nor wear resistance is an intrinsic property of tread rubber compounds; instead, they result from tribological systems of tread rubber, road surface, and any interposed materials such as water, ice, dust, etc. These systems involve an extremely complex matrix of variables including load, sliding speed, temperature, bulk viscoelasticity, interfacial interactions (e.g., adhesion and dewetting transition), physicochemical characteristics of road surface, lubrication conditions, and the like.

Perhaps due to this complexity, friction of rubber articles on wet surfaces has been the subject of comparatively little published research, particularly given the fact that the subject has been a significant concern for nearly 100 years.

A leading article, published in May 1968, suggests that friction of rubber on wet surfaces is determined entirely by energy losses (hysteresis) produced in the rubber when it is deformed by the hard surfaces over which it slides and that any friction effect due to adhesion can be ignored. Much conjecture along this line remains; see, e.g., B. N. J. Persson et al., *Phys. Rev.* B 71, 035428 (2005) in which the smoothening of a surface due to water pooling, which effectively shrinks the effective size of surface asperities thereby reducing the friction contribution due to viscoelastic deformations of the rubber induced by such asperities, is suggested to explain the reduced traction seen on wet but rough surfaces.

A predictive method for identifying and utilizing efficacious rubber formulations would be highly desirable, particularly one which might identify formulations that could be used to provide articles (e.g., tire treads) exhibiting good wet traction performance.

SUMMARY

In one aspect is provided a method for modifying a rubber formulations so as to enhance the wet traction properties of a vulcanizate prepared therefrom. The method involves identifying one or more supplemental fillers having relatively high surface free energies in water; replacing at least 15% (by wt.) of one or more of the conventional particulate fillers in the formulation with an approximately equivalent volume of supplemental filler particles; and providing the modified formulation.

In another aspect is provided a rubber formulation that can be used to provide a vulcanizate with good wet traction properties. The formulation includes one or more elastomers and at least two types of particulate filler materials including at least one of which has a relatively high surface free energy in water (i.e., a supplemental filler). The supplemental filler(s) is/are used in place of an approximately equivalent volume of the conventional filler(s). The formulation containing the supplemental filler(s) can be used to provide a vulcanizate that has a British pendulum (skid) number that is at least ~5% greater than that of a vulcanizate made from an essentially identical formulation that does not contain the supplemental filler(s).

In a still further aspect is provided a composition that includes a polymer and a particulate filler component that includes rutile titania particles that include crystalline nanoparticles, which can have a relatively high aspect ratio, e.g., on the order of 4:1. Methods of making and using this composition also are provided.

Polymers utilized in such compositions can include polyene mer units. In certain embodiments, the polyenes can be conjugated dienes, and the resulting conjugated diene mer can be incorporated substantially randomly along the polymer chain. The polymers alternatively or in addition can be substantially linear.

Functionalized polymers can interact with conventional particulate filler such as, e.g., carbon black and silica. These or other functionalized polymers also might be able to interact with the aforementioned supplemental fillers.

Other aspects of the present invention will be apparent to the ordinarily skilled artisan from the detailed description that follows.

DETAILED DESCRIPTION

Tribology, the science of interactive surfaces in relative sliding motion, incorporates various scientific disciplines such as mechanical analysis, surface chemistry, fluid mechanics, material science, lubrication systems, etc., in attempts to understand and predict mechanisms and forces at play in such interactive systems. It customarily is divided into three branches: friction (the non-fundamental force that opposes the relative motion of two surfaces in contact), lubrication, and wear.

As mentioned previously, a rolling tread surface, road surface, and any interposed materials (e.g., water, ice, dust, oil, etc.) create an extremely complex matrix of variable properties. For a freely rolling tire in the absence of braking, the overall sliding speed between the tire and road surface is zero, but slippage still exists in part of the contact area between the tire and road surface. Such slippage results in friction which leads to wear loss of material.

Using the terminology of tribology, one can see that, when a tire rolls across a road surface, the impelled motion of the tire tread creates friction when the tread contacts the road surface; the tread and road surfaces wear on each other; and any interposed materials can act to provide lubrication (either positive or negative). When the road surface is wet, the complexity of the matrix increases tremendously. For example, passenger tire treads include grooves patterns designed to direct water away from the tread/surface interface and, thus, the interposed water is not stationary but, instead, is flowing at various directions during the contact of tread and surface.

Total sliding friction of rubber articles on wet rough road surfaces includes contributions from multiple sources including (1) dissipation of energy through bulk hysteretic loss during high-frequency deformation induced by road surface asperities of various sizes; (2) interfacial interactions between the various components, including direct interactions between filler particles and the road surface; (3) viscous dissipation in the thin water film between tread and road surface; and (4) abrasion or tearing of rubber. Nevertheless, certain fundamental principles remain applicable.

Under non-sliding conditions and in an inert atmosphere, the adhesion force ($F_{adh}$) between a sphere and a flat surface, each of which is made from the same solid material, can be calculated from the Johnson-Kendall-Roberts (JKR) model as $$F_{adh} = 3\pi R \gamma_s \quad (I)$$

where $\gamma_s$ is the surface (interfacial) free energy of the solid and R is the radius of the sphere. Interfacial free energy (also known as surface free energy), a concept familiar to those who deal in subjects such as crystal growth kinetics, geochemistry, etc., is the amount of excess energy possessed by those atoms, ions, molecules, etc., at the surface of a crystal relative to those not at the surface due to their being bound to adjacent atoms, molecules, etc., in fewer directions.

In situations where the sphere and the flat surface are made of different materials and both are immersed in a liquid such as water, the adhesion force is given by $$F_{adh} = 3/2\pi R W \tag{II}$$

where W is the work of adhesion, defined as $$W = \gamma_{sl} + \gamma_{pl} - \gamma_{sp} \tag{III}$$

with $\gamma_{sl}$ being the surface free energy of the (flat) surface material in water, $\gamma_{pl}$ being the surface free energy of the sphere in water, and $\gamma_{sp}$ being the interfacial energy between sphere and surface. For the interested reader, an example of the application of these equations (with the sphere being the tip of an atomic force microscope probe) is provided by G. Papastavrou et al., *Europhys. Lett.*, 52(5), pp. 551-56 (2000).

Returning to the situation of tires sliding on a road surface, filler particles are known to affect the bulk viscoelastic properties (e.g., deformation and hysteretic loss) of the rubber components. According to formulas (II) above, those filler particles at the tread surface and in direct contact with the road surface also should impart an adhesion force with the road surface. However, as discussed in the Background section, one of the leading articles on the topic of friction of rubber on wet surfaces suggests that any friction effect due to adhesion can be ignored because it is so small (at least with respect to the other two cited components); see E. M. Bevilacqua et al., "Friction of Rubber on Wet Surfaces," *Science*, 160, pp. 959-64 (31 May 1968).

Clues that this common knowledge might be incorrect, or at least incomplete, have been accumulating for some time. For example, rubber compounds employing silica as a filler are known to provide articles with better wet traction performance than do identical compounds employing carbon black, at least when the testing surface is wetted with water. However, when testing of the same articles is conducted on a surface wetted with an organic liquid (e.g., ethanol), the advantage of the silica-containing compound disappears. (The performance of the article made from the carbon black-containing compound does not increase but, instead, the performance of the article made from the silica-containing compound is affected negatively.) See, e.g., T. Fujimaki et al., "Recent patents on silica reinforced polymers," *Nippon Gomu Kyokaishi*, 9, pp. 562-69 (1998).

Clearly, a change in wetting fluid should not affect the hysteretic properties of the vulcanized rubber article, which the common knowledge holds to be the sole factor when determining friction between the rubber article and the road surface. Instead, this fluid-dependency is similar to what has been reported on in other interfacial adhesion research; see, e.g., E. Kokkoli et al., "Effect of Solvents on Interactions between Hydrophobic Self-Assembled Monolayers," *J. of Coll. and Interface Sci.*, vol. 209, 60-65 (1999) and M. Ruths et al., "Boundary Friction of Aromatic Silane Self-Assembled Monolayers Measured with the Surface Forces Apparatus and Friction Force Microscopy," *J. Phys. Chem. B*, vol. 107, pp. 11149-57 (2003).

Research leading to the inventive methods and compounds set forth herein suggests that adhesion forces predicted by formula (II) indeed are present and, in fact, can provide significant advantages when designing and preparing rubber compounds intended for use in situations where wet traction can be important, e.g., tread compounds. More specifically, it suggests that a primary reason that adhesion effects have appeared to be negligible can be attributed to the nature of particulate fillers commonly employed in tires, specifically, carbon black and, to a lesser extent, silica.

According to formula (II), if the radius of the sphere is held constant, the only way to increase the adhesion force ($F_{adh}$) is to increase the work of adhesion (W). According to formula (III), the work of adhesion is the combination of three variables, one of which ($\gamma_{sl}$) is essentially fixed when the road surface is put into place. Thus, to increase the work of adhesion (W) and thereby the adhesion force ($F_{adh}$), one must increase $\gamma_{pl}$, decrease $\gamma_{sp}$, or both.

Set forth in the following table is a list of interfacial free energies of various minerals in water; the data comes from A. C. Lagasa, *Kinetic Theory in the Earth Sciences*, (Princeton University Press, 1998), p. 499. For comparative purposes, the free energy of the water-air interface typically is reported as 71.96 mJ/m$^2$.

TABLE 1

Interfacial free energies in water

| Mineral | Chemical formula | $\gamma_{pl}$ (mJ/m$^2$) |
|---|---|---|
| fluorite | CaF$_2$ | 120 |
| calcite | CaCO$_3$ | 97 |
| witherite | BaCO$_3$ | 115 |
| cerussite | PbCO$_3$ | 125 |
| gypsum | CaSO$_4$·2H$_2$O | 26 |
| celestine | SrSO$_4$ | 85 |
| barite | BaSO$_4$ | 135 |
| F-apatite | Ca$_5$(PO$_4$)$_3$F | 289 |
| OH-apatite | Ca$_5$(PO$_4$)$_3$OH | 87 |
| OCPp | Ca$_4$H(PO$_4$)$_3$·xH$_2$O | 26 |
| portlandite | Ca(OH)$_2$ | 66 |
| brucite | Mg(OH)$_2$ | 123 |
| goethite | FeO(OH) | 1600 |
| hematite | Fe$_2$O$_3$ | 1200 |
| zincite | ZnO | 770 |
| tenorite | CuO | 690 |
| gibbsite(001) | Al(OH)$_3$ | 140 |
| gibbsite(100) | Al(OH)$_3$ | 483 |
| quartz | SiO$_2$ | 350 |
| amorphous silica | SiO$_2$ | 46 |
| kaolinite | Al$_2$Si$_2$O$_5$(OH)$_4$ | >200 |
| sodium disilicate melt | Na$_2$Si$_2$O$_5$ | 55 |
| pyrite(100) | FeS$_2$ | 3155 |
| pyrite(111) | FeS$_2$ | 4733 |

This data shows that one of the most common particulate fillers, amorphous silica, would provide a $\gamma_{pl}$ value surface free energy of the sphere in water) that is less than that of the water-air interface and approximately the same as the expected $\gamma_{sl}$ surface free energy of the surface material in water) given the typical components found in most concretes (e.g., Ca(OH)$_2$, CaSO$_4$.2H$_2$O, etc.). The interfacial free energy of carbon black is not widely reported, but it is believed to be on the same order or less than that of amorphous silica.

However, not all of the listed materials possess these types of relatively small $\gamma_{pl}$ values. Some of these materials exhibit $\gamma_{pl}$ values of ~300 mJ/m$^2$ (F-apatite), ~350 mJ/m$^2$ (quartz), ~450 to ~500 mJ/m$^2$ (the (100) lattice plane of aluminum trihydrate), ~700 mJ/m$^2$ (cupric oxide), ~775 to ~800 mJ/m$^2$ (zinc oxide), greater than 1000 mJ/m$^2$ (ferric oxide), greater than 1500 mJ/m$^2$ (ferric hydroxide), and even greater than 3000 mJ/m$^2$ (the two forms of pyrite); not listed in Table 1 but also known to possess a high $\gamma_{pl}$ value (on the order of ~400) is cupric hydroxide. Given this type of information, the ordinarily skilled artisan can find other substances with similarly high $\gamma_{pl}$ values for use in accord with the teaching of the present invention.

While individual exceptions certainly exist, the carbonate, sulfate, phosphate, and hydroxide minerals generally exhibit lower $\gamma_{pl}$ values than do the oxide and sulfide materials.

The predictive methods set forth in the Summary involve the selection of one or more supplemental fillers having relatively high $\gamma_{pl}$ values. The term "relatively high" can be defined or characterized in a variety of ways such as, e.g., greater than that of the water-air interface, preferably several multiples (e.g., at least 2×, at least 3× or even at least 4×) of this value; at least several multiples (e.g., at least 2×, at least 3×, at least 4×, at least 5×, at least 6×, at least 7×, at least 8×, at least 9× or even at least 10×) of the $\gamma_{pl}$ value for amorphous silica; in absolute terms such as, e.g., at least ~300, at least ~350, at least ~400, at least ~450, at least ~500, at least ~550, at least ~600, at least ~650, at least ~700, at least ~750, at least ~1000, at least ~1500, and at least ~2000 mJ/m$^2$; in ranges such as, e.g., from ~300 to ~5000 mJ/m$^2$, from ~350 to ~4000 mJ/m$^2$, from ~400 to ~5000 mJ/m$^2$, from ~450 to ~4000 mJ/m$^2$, from ~500 to ~5000 mJ/m$^2$, and various sub-ranges within the foregoing and/or other combinations of high and low values; and the like.

Compounding is the process whereby vulcanizates are formed from ingredients that include elastomers, fillers, additives, curatives, etc.

The nature of the elastomer(s) which can be employed is not believed to have a significant effect on the utility of the methods described herein. Non-limiting examples of elastomers include the following, individually as well as in combination, according the desired final viscoelastic properties of the rubber compound: natural rubber, homo- and interpolymers that include just polyene-derived mer units (e.g., poly (butadiene), poly(isoprene), and interpolymers incorporating butadiene, isoprene, and the like), SBR, butyl rubber, neoprene, EPR, EPDM, NBR, silicone rubber, fluoroelastomers, ethylene/acrylic rubber, EVA, epichlorohydrin rubbers, chlorinated polyethylene rubbers, chlorosulfonated polyethylene rubbers, hydrogenated nitrile rubber, tetrafluoroethylene/propylene rubber, silicone rubbers, specialty rubbers (including heat- and oil-resistant rubbers), and the like, with the foregoing terms being used similarly as in the aforementioned *The Vanderbilt Rubber Handbook*. Some of the most commonly used elastomers include natural rubber, polyisoprene, styrene/butadiene interpolymers, and polybutadiene. Commercial sources for natural and synthetic rubber are well known in the art.

One of more polymers can include mer units that include unsaturation such as those derived from polyenes, particularly dienes and trienes (e.g., myrcene); illustrative polyenes include $C_4$-$C_{12}$ dienes, particularly conjugated dienes such as, but not limited to, 1,3-butadiene, isoprene, 1,3-pentadiene, 2,3-dimethyl-1,3-butadiene, and 1,3-hexadiene. Polyenes can incorporate into polymeric chains in more than one way. Especially for tire tread applications, controlling this manner of incorporation can be desirable. A polymer chain with an overall 1,2-microstructure, given as a numerical percentage based on total polyene content, of from about 10 to about 80%, optionally from about 25 to 65%, can be desirable for certain end use applications. A polymer that has an overall 1,2-microstructure of no more than ~50%, preferably no more than ~40%, and even more preferably no more than ~30%, based on total polyene content, is considered to be "substantially linear". For certain end use applications, however, keeping the content of 1,2-linkages even lower—e.g., to less than 5% or even less than 1%—can be desirable.

Depending on the intended end use, one or more of the polymer chains can include pendent aromatic groups, which can be provided, e.g., through incorporation of mer units derived from vinyl aromatics, particularly the $C_8$-$C_{20}$ vinyl aromatics such as, e.g., styrene, α-methyl styrene, p-methyl styrene, the vinyl toluenes, and the vinyl naphthalenes. When used in conjunction with one or more polyenes, mer units with pendent aromaticity can constitute up to ~80%, commonly up to ~50%, more commonly from ~10 to ~45%, and in certain embodiments from ~20 to ~35%, of the polymer chain, particularly where the polymer is intended for applications such as tire tread compounds. The microstructure of such interpolymers can be random, i.e., the mer units derived from each type of constituent monomer do not form blocks and, instead, are incorporated in a non-repeating, essentially simultaneous manner; this can provide particular benefit in some end use applications such as, e.g., rubber compositions used in the manufacture of tire treads.

The number average molecular weight ($M_n$) of synthesized polymers typically is such that a quenched sample exhibits a gum Mooney viscosity ($ML_4/100°$ C.) of from ~2 to ~150, commonly from ~5 to ~100, and more commonly from ~10 to ~75. Exemplary $M_n$ values range from ~5000 to ~200,000, commonly from ~25,000 to ~150,000, and typically from ~50,000 to ~125,000.

Synthetic polymers commonly are made by emulsion polymerization or solution polymerization, with the latter affording greater control with respect to such properties as randomness, microstructure, etc.; the general aspects of both types of polymerizations (with solution polymerizations including both living and pseudo-living polymerizations) are familiar to the ordinarily skilled artisan. Synthetic polymers also commonly are functionalized to enhance interactivity of the polymer with particulate fillers, particularly carbon black and silica. Functionalization of solution polymers often occurs at the "polymer cement" stage, prior to quenching; this too is a familiar concept to the ordinarily skilled artisan. The interested reader is directed to the extensive bodies of patent and non-patent literature that describe such polymerizations and functionalizations in greater detail.

After synthesis, synthetic rubber commonly undergoes one or more of quenching, drying, and/or coagulation prior to storage and further processing.

Ratios of polymers used in blends, often expressed in a manner such that the sum of the component parts equals 100 parts, can vary extensively according to the viscoelastic properties desired for a particular polymerized rubber compound. Without undue experimentation and instructed by the extensive body of patent and non-patent literature on rubber compounding, the ordinarily skilled artisan can determine the identity and amounts of elastomers that might provide a particular desired range of viscoelastic properties for a variety of rubber components that ultimately are assembled into a final article such as, e.g., an uncured tire, which often are then vulcanized with crosslinking agents.

As mentioned previously, the types of inorganic fillers with high interfacial free energies employed generally are not intended to replace standard fillers and, instead, typically supplement the properties which such fillers provide to vulcanized articles. Commonly employed fillers include carbon black and/or silica. Elastomeric compounds typically are filled to a volume fraction (the total volume of added filler(s) divided by the total volume of the elastomeric stock) of about 25%; accordingly, typical (combined) amounts of reinforcing fillers is about 30 to 100 parts by weight (pbw) per 100 parts of polymer (phr).

Potentially useful carbon black materials include, but are not limited to, furnace blacks such as super abrasion furnace blacks, high abrasion furnace blacks, fast extrusion furnace blacks, fine furnace blacks, intermediate super abrasion furnace blacks, and semi-reinforcing furnace blacks; channel blacks such as medium processing channel blacks, hard processing channel blacks, and conducting channel blacks; acetylene blacks; and lamp blacks. Mixtures of two or more of these can be used. Carbon blacks having a surface area (EMSA) of at least 20 m$^2$/g, preferably at least about 35 m$^2$/g, are preferred; surface area values can be determined by ASTM D-1765. The carbon blacks may be in pelletized form or an unpelletized flocculent mass, although unpelletized carbon black can be preferred for use in certain mixers.

The amount of carbon black utilized historically has been up to ~50 phr, with ~5 to ~40 phr being typical. For certain oil-extended formulations, the amount of carbon black has been even higher, e.g., on the order of ~80 phr.

Amorphous silica also is a commonly used filler. Silicas typically are produced by a chemical reaction in water, from which they are precipitated as ultrafine, spherical particles which strongly associate into aggregates and, in turn, combine less strongly into agglomerates. Surface area gives a reliable measure of the reinforcing character of different silicas, with BET (see; Brunauer et al., *J. Am. Chem. Soc.*, vol. 60, p. 309 et seq.) surface areas of less than 450 m$^2$/g, commonly between ~32 to ~400 m$^2$/g, and typically ~100 to ~250 m$^2$/g, generally being considered useful. Commercial suppliers of silica include PPG Industries, Inc. (Pittsburgh, Pa.), Grace Davison (Baltimore, Md.), Degussa Corp. (Parsippany, N.J.), Rhodia Silica Systems (Cranbury, N.J.), and J.M. Huber Corp. (Edison, N.J.).

When silica is employed as a reinforcing filler, addition of a coupling agent such as a silane is customary so as to ensure good mixing in, and interaction with, the elastomer(s). Generally, the amount of silane that is added ranges between about 4 and 20%, based on the weight of silica filler present in the compound. Coupling agents can have a general formula of A-T-J, in which A represents a functional group capable of bonding physically and/or chemically with a group on the surface of the silica filler (e.g., surface silanol groups); T represents a hydro-carbon group linkage; and J represents a functional group capable of bonding with the elastomer (e.g., via a sulfur-containing linkage). Such coupling agents include organosilanes, in particular polysulfurized alkoxysilanes (see, e.g., U.S. Pat. Nos. 3,873,489, 3,978,103, 3,997,581, 4,002,594, 5,580,919, 5,583,245, 5,663,396, 5,684,171, 5,684,172, 5,696,197, etc.) or poly-organosiloxanes bearing the J and A functionalities mentioned above. Addition of a processing aid can be used to reduce the amount of silane employed; see, e.g., U.S. Pat. No. 6,525,118 for a description of fatty acid esters of sugars used as processing aids. Additional fillers useful as processing aids include mineral fillers, such as clay (hydrous aluminum silicate), talc (hydrous magnesium silicate), and mica as well as non-mineral fillers such as urea and sodium sulfate. Preferred micas contain principally alumina, silica and potash, although other variants are also useful. The additional fillers can be utilized in an amount of up to about 40 phr, typically up to about 20 phr.

Silica commonly is employed in amounts of up to ~100 phr, typically from ~5 to ~80 phr. The useful upper range is limited by the high viscosity that such fillers can impart. When carbon black also is used, the amount of silica can be decreased to as low as ~1 phr; as the amount of silica decreases, lesser amounts of the processing aids, plus silane if any, can be employed.

As used herein, the term "supplemental filler" is used to describe or convey those filler materials set forth above which have relatively high $\gamma_{pl}$ values. While exceptions certainly can exist, the materials used as supplemental fillers typically are more dense than either carbon black or amorphous silica. Specific gravity values for a variety of filler particles are listed in the following table:

TABLE 2

Specific gravity values

| Filler particle | Specific gravity |
|---|---|
| carbon black | 1.8 |
| precipitated silica | 2 |
| quartz | 2.65 |
| Al(OH)$_3$ | 2.42 |
| Fe(OH)$_3$ | 4.03 |
| Fe$_2$O$_3$ | 4.9 |
| FeS | 4.6 |
| ZnO | 5.6 |

One type of particulate filler that might deviate from this density trend is the aforementioned rutile crystalline titania nanoparticles. These are known to have a relatively high aspect ratio, e.g., on the order of 4:1. Most commercially available versions are somewhat needle-like, having average diameters of about 10 nm (i.e., ~5 to ~15 nm, more typically ~7.5 to ~12.5 nm) and average lengths of about 40 nm (i.e., ~25 to ~50 nm, more typically ~30 to ~45 nm, and most typically from ~32 to ~44 nm). These types of nanoparticles also generally have a BET surface area of ~160 m$^2$/g±20%.

In view of the foregoing, replacing a particular mass of carbon black or silica with an equal mass of a supplemental filler typically will result in a much smaller volume of overall filler being present in a given compound. Accordingly, in the description and examples that follow, replacements have been made on an equal volume, as opposed to equal weight, basis so as to ensure that a significant number of the supplemental filler particles are available on the tread surface.

Generally, replacing ~15 to ~60% (by wt.) of the conventional particulate filler material(s) with an approximately equivalent (~0.8× to ~1.2×) volume of supplemental filler particles is recommended. In certain embodiments, replacing ~16 to ~58% (by wt.) of the conventional particulate filler material(s) with an approximately equivalent (~0.85× to ~1.15×) volume of supplemental filler particles is sufficient; in other embodiments, replacing ~17 to ~55% (by wt.) of the conventional particulate filler material(s) with an approximately equivalent (~0.9× to ~1.1×) volume of supplemental filler particles is adequate; in still other embodiments, replacing ~18 to ~53% (by wt.) of the conventional particulate filler material(s) with an approximately equivalent (~0.95× to ~1.05×) volume of supplemental filler particles can be preferable.

The weight inequality issue might be able to be overcome or ameliorated by employing non-standard supplemental particles. For example, one can envision essentially hollow particles of one or more types of supplemental fillers as well as relatively light particles coated so as to have a surface that includes one or more of types of supplemental filler compounds.

The supplemental fillers generally can be of approximately the same size as the conventional fillers employed in compounds. In other words, neither extremely large particles such as those employed in the aforementioned U.S. Pat. No. 5,066,702 nor extremely small particles such as those employed in the aforementioned U.S. Pat. No. 6,972,307 are required. In general, relatively small particles are preferred both for reinforcement purposes and to ensure a large number of particles are available at the tread surface.

Based on the enhanced interactivity with conventional fillers that can be achieved through functionalization of polymer chains, it might be desirable to include functional groups that are designed to enhance interactivity with supplemental fillers; this might be in place of or in addition to functional groups designed to enhance interactivity with conventional fillers.

Other conventional additives also commonly are used in compounds. These include, for example, process oils, plasticizers, anti-degradants such as antioxidants and antiozonants, curing agents (typically ~0.2 to ~5 phr of one or more vulcanizing agents such as, for example, sulfur or peroxide-based curing systems—for a general disclosure of suitable vulcanizing agents, see Kirk-Othmer, *Encyclopedia of Chem. Tech.*, 3d ed., (Wiley Interscience, New York, 1982), vol. 20, pp. 365-468), and the like.

Typically, compound ingredients are mixed using standard equipment such as, e.g., Banbury or Brabender mixers, in two or more stages. During the first stage (often referred to as the masterbatch stage), mixing typically is begun at temperatures of ~100° to ~125° C. and increases until a so-called drop temperature, typically ~165° C., is reached. Where a compound includes silica, a separate re-mill stage often is employed for separate addition of the silane component(s). This stage often is performed at temperatures similar to, although often slightly lower than, those employed in the masterbatch stage, i.e., ramping from ~90° C. to a drop temperature of ~150° C. Vulcanizing agents, accelerators, etc., are added at a final mixing stage; to reduce the chances of undesirable scorching and/or premature onset of vulcanization, this mixing step often is done at lower temperatures, e.g., starting at ~60° to ~65° C. and not going higher than ~105° to ~110° C.

Subsequently, the compounded mixture is processed (e.g., milled) into sheets prior to being formed into any of a variety of components and then vulcanized, which typically occurs at ~5° to ~15° C. higher than the highest temperatures employed during the mixing stages, most commonly about 170° C.

Over the years, numerous testing devices have been developed and used to measure the friction of rubber articles on both dry and wet surfaces. While the efficacy of the methods and compositions described herein should be apparent regardless of device employed, the British pendulum tester has been used in the examples that follow. In large part, this is due to its ubiquity due to wide acceptance and standardization of procedures. The May 1983 American Chemical Society (Rubber Division) meeting included a presentation in which a positive correlation between BPST testing and tire road testing is described. ASTM E 303-93 (1998), entitled "Standard Test Method for Measuring Frictional Properties Using the British Pendulum Tester," sets forth an accepted method of using this type of testing device.

By following the formulations and formulating methods set forth herein, one can obtain compounds that can be used to provide vulcanizates that exhibit superior BPST values compared to vulcanizates employing only conventional types of fillers. More specifically, one can obtain vulcanizates having BPST values that are at least ~5% greater than that of a vulcanizate made from an essentially identical formulation that does not contain supplemental filler(s). In certain embodiments, this increase can be as great as at least ~5.25%, ~5.5%, ~5.75%, ~6%, ~6.25, ~6.5%, ~6.75%, ~7%, ~7.5%, ~8%, ~8.5%, ~9%, ~9.5%, ~10%, or even at least ~11%.

Specifically referenced patents and publications are incorporated herein by reference.

The following non-limiting, illustrative examples provide the reader with detailed conditions and materials that can be useful in the practice of the present invention. All values given in the form of percentages herein throughout are weight percentages unless the surrounding text explicitly indicates a contrary intention. In those examples, a plot of wet traction versus filler surface free energy in water has not been provided because of the difficulty in preparing a scientifically valid group of normalized rubber compounds due, in large part, to the particle size distributions of commercially available mineral particles; however, as a wider variety of particles with relatively uniform geometries and sizes becomes available, obtaining the data for this type of plot is expected to become more feasible.

EXAMPLES

Examples 1-10

The basic formulation employed in these examples is set forth in the following table where 6-PPD (N-(1,3-dimethylbutyl)-N'-phenyl-p-phenylenediamine) acts as an antioxidant, while MBTS (dibenzothiazole disulfide), TBBS (N-t-butyl-benzothiazole sulfenamide) and DPG (N,N'-diphenylguanidine) act as vulcanization accelerators. The polymer used in Table 3 was an SBR random copolymer having a glass transition temperature of about −29.5° C.

TABLE 3

| Compound formulation | |
|---|---|
| | Amount (phr) |
| Masterbatch | |
| polymer | 100 |
| carbon black (N339 type) | 50 |
| supplemental filler | x |
| 6-PPD | 1 |
| stearic acid | 2 |
| Re-mill | |
| polysulfide organosilane | y |
| Final | |
| ZnO | 3 |
| DPG | 0.5 |
| MBTS | 1 |
| TBBS | z |
| sulfur | 1.3 |
| TOTAL | 158.8 |

For Example 1, which was a control (all carbon black) formulation, x, y, and z all were 0, thus making a total of 158.8 phr. A test article made from this compound was tested on a British pendulum (skid) tester, and this result (a British pendulum number, BPN) is normalized to 100 for easy comparison to all other samples.

For the remaining examples, the formulation from Table 3 was modified by replacing half (25 phr) of the carbon black with various supplemental fillers, increasing the sulfur to 1.5 phr, and using the amounts shown in the following table for x, y, and z.

TABLE 4

Modifications to formulation from Table 3

| | Supplemental filler | x (phr) | y (phr) | z (phr) |
|---|---|---|---|---|
| Example 2 | Fe(OH)$_3$ surface area = 24.0 m$^2$/g | 55.97 | 2.8 | 1.3 |
| Example 3 | Fe(OH)$_3$ surface area = 11.3 m$^2$/g | 55.97 | 2.8 | 1.3 |
| Example 4 | Fe$_2$O$_3$ surface area = 13.0 m$^2$/g | 72.22 | 2.8 | 1.3 |
| Example 5 | Fe$_2$O$_3$[a] surface area = 13.0 m$^2$/g | 72.22 | 2.8 | 1.3 |
| Example 6 | quartz 97% smaller than 5 μm | 36.80 | 2 | 1.3 |
| Example 7 | FeS ≥70% smaller than ~37 μm[b] | 63.89 | 0 | 0 |
| Example 8 | ZnO surface area = 29 m$^2$/g | 77.78 | 0 | 0 |
| Example 9 | ZnO[c] surface area = 29 m$^2$/g | 77.78 | 0 | 0 |

[a]Prepared under different processing conditions than the particles used in Example 4.
[b]The size of the openings in a 400 mesh screen.
[c]Same particles as Example 8 but coated with a silane prior to use.

These samples were skid tested similarly to Example 1, and the resulting BPN values are provided in the following table.

TABLE 5

British pendulum (skid) values for Examples 2-9

| | 2 | 3 | 4 | 5 | 6 | 7 | 8 | 9 |
|---|---|---|---|---|---|---|---|---|
| BPST value | 108 | 108 | 109 | 108 | 108 | 106.5 | 111 | 111 |

The data from Table 5 indicate that articles made from compounds in which half (by volume) of carbon black filler is replaced with a supplemental filler having a relatively high $\gamma_{pl}$ value can exhibit BPN values that are up to 11% higher than those for an article made from a carbon black-only formulation. Further, these results were derived from compounds employing only supplemental filler materials that were readily available from commercial sources (e.g., the FeS particles were larger than that which likely would be used in actual practice), so additional improvements based on optimization are likely.

Figure 1:
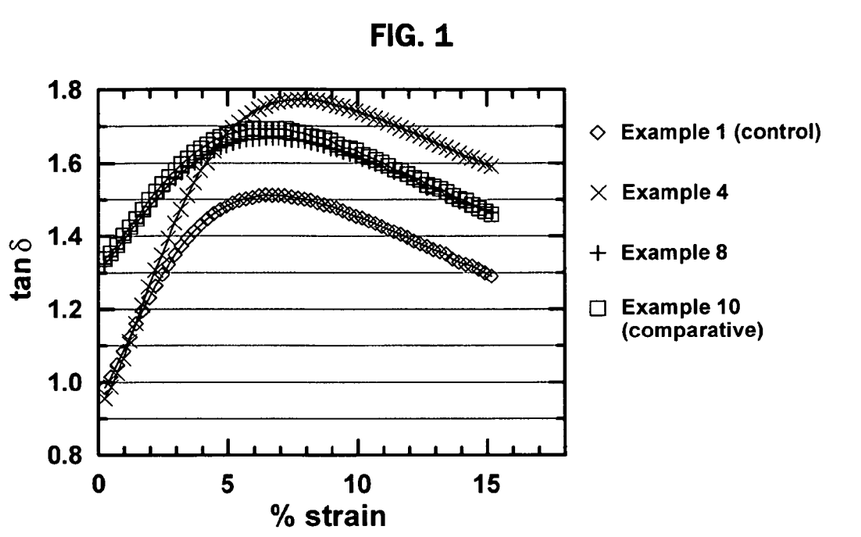
FIG. 1 is a plot of tan δ data acquired from strain sweep testing (at −15° C. and 1 Hz) on four vulcanizates made from different filled compositions.
Figure 2:
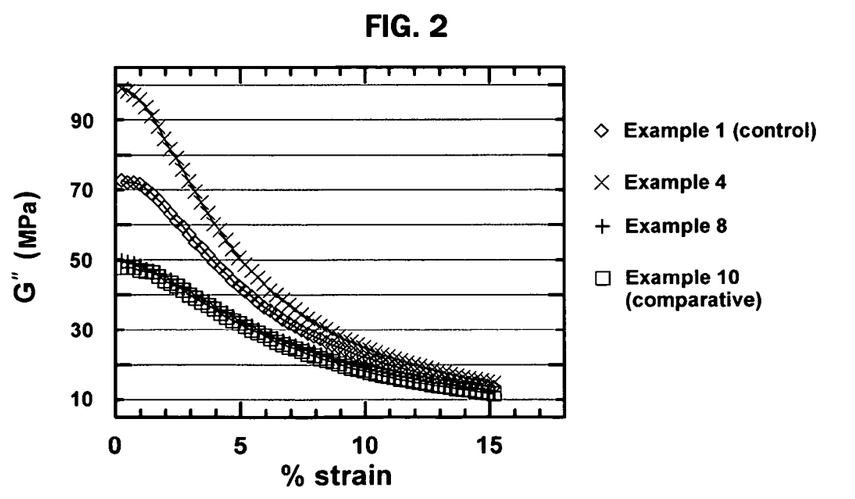
FIG. 2 is a plot of G" data acquired from strain sweep testing (at −15° C. and 1 Hz) performed on the same four vulcanizates tested in FIG. 1.

Further, the increase in wet traction performance is not believed to be attributable to a change in the hysteretic properties of the rubber. For example, formulations such as the control (Example 1), Fe$_2$O$_3$ particle-containing (Example 4), and ZnO particle-containing (Example 8) were tested against a comparative where half of the N339-type carbon black had been replaced with N990-type carbon black (comparative Example 10); the nitrogen adsorption surface area of N339- and N990-types are 96 and 9 m$^2$/g, respectively. The testing involved strain sweep testing at −15° C. (1 Hz) to yield data from which tan δ and G" curves could be obtained. The resulting curves are shown in FIGS. 1 and 2.

Common wisdom would hold that those compounds exhibiting the highest tan δ value at low temperatures should provide the best wet traction performance. Based on this, the data of the first graph would seem to indicate that the ZnO particle-containing formulations (such as Examples 8-9) should have wet traction performance very similar to that of the N990 carbon black-containing formulation (comparative Example 10). However, in actuality, the comparative had a BPN value that was only very slightly above that of the control (Example 1) while, as indicated above in Table 4, the ZnO particle-containing formulations (Examples 8-9) exhibit at least an 11% increase over that same control.

Additional vulcanizates prepared from compositions employing polymers other than solution polymerized SBR displayed increases BPN values even more significant than those seen above in Table 5.

Examples 11-15

The basic formulation employed in these examples is set forth in the following table where TMTM (tetramethylthiuram monosulfide) acts as a vulcanization accelerator, Hi-Sil™ 190G hydrated amorphous silica is a granule-type silica having a BET surface area of ~495 m$^2$/g (PPG Silica Products; Monroeville, Pa.), Tronox™ CR-837 alumina-stabilized TiO$_2$ (rutile phase) is a filler having a particle size of ~0.17 μm and a specific gravity of ~4.2 (Tronox Inc.; Oklahoma City, Okla.), and TiO$_2$ nanopowder includes crystalline nanoparticles (rutile phase) having an average diameter of ~10 nm, an average length of ~40 nm, and a BET surface area of 130-190 m$^2$/g. Amounts are in phr.

TABLE 6

Compound formulations

| | 11 | 12 | 13 | 14 | 15 |
|---|---|---|---|---|---|
| Masterbatch | | | | | |
| polymer | 137.5 | 137.5 | 137.5 | 137.5 | 137.5 |
| carbon black (N234 type) | 70 | 35 | 35 | 35 | 35 |
| carbon black (N990 type) | 0 | 35 | 0 | 0 | 0 |
| Hi-Sil | 0 | 0 | 38.89 | 0 | 0 |
| Tronox ™ CR-837 TiO$_2$ | 0 | 0 | 0 | 81.67 | 0 |
| TiO$_2$ nanopowder | 0 | 0 | 0 | 0 | 81.67 |
| 6-PPD | 0.95 | 0.95 | 0.95 | 0.95 | 0.95 |
| wax | 1.5 | 1.5 | 1.5 | 1.5 | 1.5 |
| stearic acid | 2 | 2 | 2 | 2 | 2 |
| Re-mill | | | | | |
| polysulfide organosilane | 0 | 0 | 3.89 | 3.89 | 3.89 |
| Final | | | | | |
| ZnO | 2 | 2 | 2 | 2 | 2 |
| TMTM | 0.2 | 0.2 | 0.2 | 0.2 | 0.2 |
| MBTS | 0.2 | 0.2 | 0.2 | 0.2 | 0.2 |
| TBBS | 0.8 | 0.8 | 0.8 | 0.8 | 0.8 |
| sulfur | 1.7 | 1.7 | 1.7 | 1.7 | 1.7 |
| TOTAL | 216.85 | 216.85 | 224.63 | 267.41 | 267.41 |

These formulations were mixed and cured. (Examples 11-14 were cured for 15 minutes, while Example 15 was cured for 30 minutes.) Results of testing on these vulcanizates are summarized below in Table 7.

TABLE 7

Testing data from Examples 11-15

| | 11 | 12 | 13 | 14 | 15 |
|---|---|---|---|---|---|
| Shore A hardness, 3.0 sec, 23° C. | 58.9 | 47.9 | 59.3 | 52.3 | 61.1 |
| Cure testing, 23° C. | | | | | |
| ML (kg · cm) | 12.1 | 9.3 | 12.1 | 12.0 | 13.4 |

TABLE 7-continued

Testing data from Examples 11-15

|  | 11 | 12 | 13 | 14 | 15 |
|---|---|---|---|---|---|
| MH (kg·cm) | 2.4 | 1.3 | 2.3 | 1.3 | 2.4 |
| $t_{90}$ (min.) | 6.75 | 7.00 | 9.74 | 6.19 | 27.74 |
| Tensile testing, 23° C. | | | | | |
| modulus, 100% strain (MPa) | 2.55 | 1.70 | 2.37 | 2.36 | 2.42 |
| modulus, 300% strain (MPa) | 8.80 | 5.48 | 7.76 | 6.73 | 7.03 |
| $T_b$ (MPa) | 24.7 | 18.1 | 25.4 | 19.3 | 23.1 |
| $E_b$ (%) | 714 | 789 | 778 | 714 | 772 |
| Ring tear, 100° C. | | | | | |
| strength (N/mm) | 27.7 | 9.2 | 34.5 | 11.9 | 29.9 |
| travel at tear (%) | 462 | 308 | 548 | 282 | 792 |
| Temperature sweep, 5 Hz | | | | | |
| Temp. at tan δ peak (° C.) | −16.9 | −15.6 | −17.0 | −15.5 | −17.0 |
| G' @ 62° C. and 2.0% strain (MPa) | 5.0 | 2.5 | 4.7 | 3.4 | 6.2 |
| tan δ @ 62° C. and 2.0% strain | 0.307 | 0.154 | 0.229 | 0.123 | 0.245 |
| Strain sweep, 5.0% strain and 1 Hz | | | | | |
| G' @ 60° C. (MPa) | 2.13 | 1.21 | 2.22 | 1.50 | 2.04 |
| tan δ @ 60° C. | 0.300 | 0.181 | 0.248 | 0.146 | 0.267 |
| G' @ 0° C. (MPa) | 7.12 | 3.11 | 13.8 | 3.46 | 5.60 |
| tan δ @ 0° C. | 0.616 | 0.483 | 1.10 | 0.461 | 0.555 |
| G' @ −12° C. (MPa) | 16.1 | 7.52 | 6.46 | 7.84 | 10.9 |
| tan δ @ −12° C. | 1.11 | 1.22 | 0.564 | 1.16 | 1.04 |
| Lambourn wear resistance | | | | | |
| Index at 25% slip | 100.0 | 95.5 | 120.9 | 72.7 | 112.1 |
| Index at 65% slip | 100.0 | 64.4 | 110.7 | 60.1 | 99.7 |
| BPST value | 100.0 | 101.6 | 107.5 | 110.8 | 113.3 |

The BPST values for each example in Table 7 are averages of two tests, each conducted on the same Portland cement concrete surface.

In addition to the impressive BPST value for the vulcanizate made from the $TiO_2$ nanopowder-containing compound (Example 15), that same vulcanizate was seen to have good tear strength at 100° C., good Lambourn wear resistance, and satisfactory high elastic modulus. Overall, its performance was far superior to the vulcanizate made from the more conventional $TiO_2$ particle-containing compound (Example 14).

That which is claimed is:

1. A method for providing a vulcanizable compound, comprising:
   a) providing a first formula for a rubber composition in which a conventional particulate filler selected from silica, carbon black or a mixture thereof comprises from about 30 to about 100 parts per hundred rubber of said composition;
   b) identifying a target amount of from about 15 to about 60 weight percent of said conventional particulate filler to be replaced and determining the volume of said target amount;
   c) identifying at least one particulate filler having an interfacial free energy in water of at least about 300 $mJ/m^2$ and, based thereon, selecting at least one additional particulate filler;
   d) determining a weight of said at least one additional particulate filler from step c) that provides a volume that approximately equivalently replaces said volume of said target amount of conventional particulate filler;
   e) providing a second formula for a rubber composition that employs the particulate filler weight from step (d) in place of said target amount of conventional particulate filler; and
   f) preparing a rubber composition based on said second formula, thereby providing said vulcanizable compound.

2. The method of claim 1 wherein said target amount is from about 18 to about 53 weight percent.

3. The method of claim 1 wherein said second formula comprises at least one additional particulate filler having an interfacial free energy in water at least about 500 $mJ/m^2$.

4. The method of claim 1 wherein said second formula comprises at least one additional particulate filler having an interfacial free energy in water at least about 1000 $mJ/m^2$.

5. The method of claim 1 wherein said second formula comprises at least one additional particulate filler having an interfacial free energy in water at least about 1500 $mJ/m^2$.

6. The method of claim 1 wherein said second formula comprises at least one additional particulate filler having an interfacial free energy in water at least about 2000 $mJ/m^2$.

7. The method of claim 1 wherein at least one of said at least one additional particulate filler has a mean particle diameter of at least 0.01 μm and less than 10 μm.

8. The method of claim 1 wherein said at least one additional particulate filler comprises crystalline nanoparticles of rutile $TiO_2$.

9. The method of claim 8 wherein said nanoparticles have an average diameter of about 10 nm.

10. The method of claim 9 wherein said nanoparticles have an average length of about 40 nm.

* * * * *